United States Patent Office 3,544,603
Patented Dec. 1, 1970

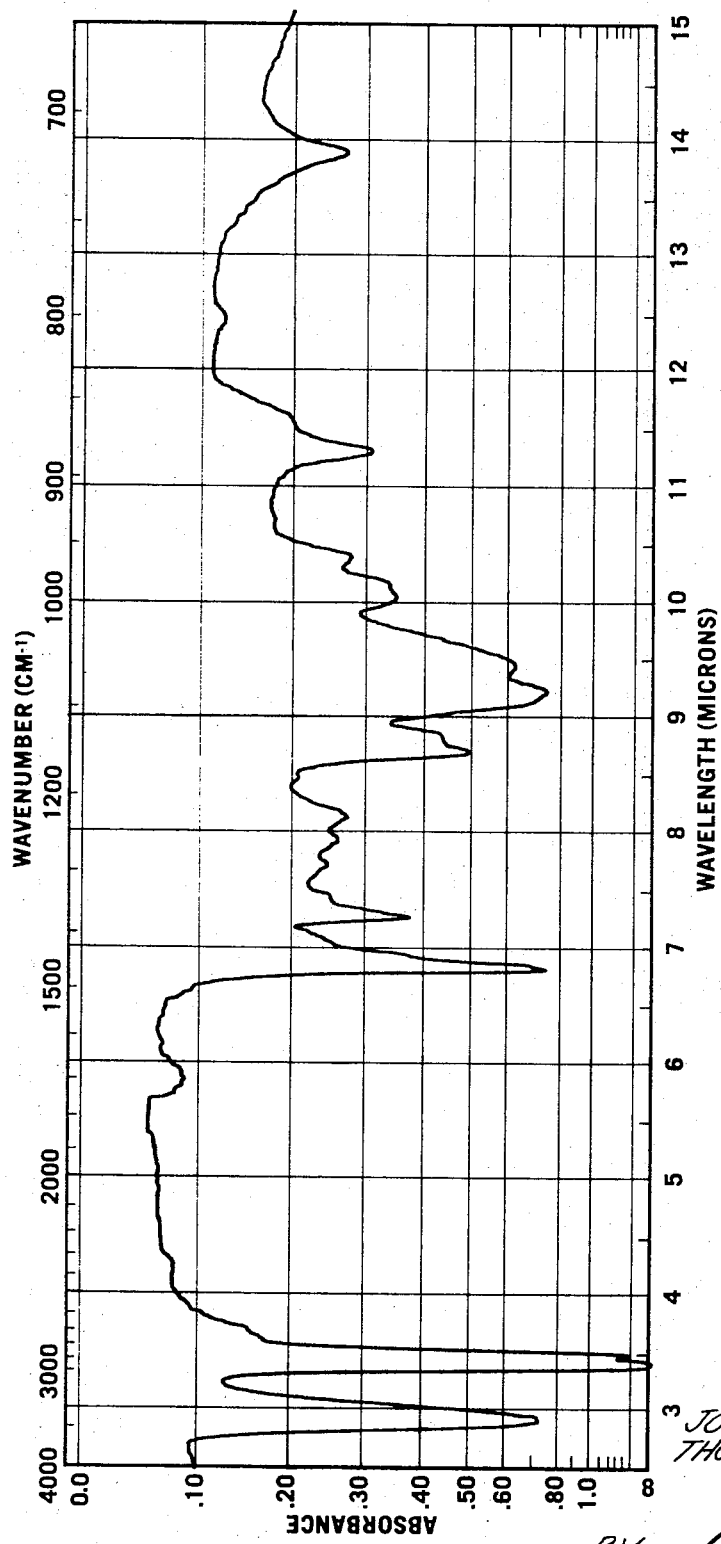

3,544,603
ALKYL-TETRAHYDROPYRANOLS AND ETHOXY-LATED ALKYL-TETRAHYDROPYRANOLS
John J. Morrisroe, Huntington Beach, and Thomas F. Banigan, Arcadia, Calif., assignors to Pilot Chemical Company, Santa Fe Springs, Calif., a corporation of California
Filed Feb. 27, 1967, Ser. No. 618,824
Int. Cl. C07d 7/04
U.S. Cl. 260—345.9         6 Claims

ABSTRACT OF THE DISCLOSURE

Higher alpha olefins containing from about 8 to 24 carbon atoms can be reacted with an aldehyde in the presence of a concentrated acid to form a product which contains novel higher alcohols and which can be ethoxylated to form a nonionic detergent. The olefin and aldehyde reaction product is purified by treating with an aqueous mineral acid at elevated temperatures. The reaction product contains alkyltetrahydropyranols and alkyl meta-dioxanes which may be converted to form novel linear 1,3-glycols. These alcohol containing reaction products may be used in the formulation of detergents.

BACKGROUND OF THE INVENTION

In recent years, there has been a large growth in the use of nonionic detergents. This growth has been due in part to special properties such as whiteness, liquid state, increasing activity with temperature and effectiveness without the requirement for the presence of builders.

Nonionic detergents formed by the ethoxylation of linear alcohols have the disadvantage of high cost of the alcohols. With the recent availability of alpha olefins in the detergent range, there have been many efforts to find suitable low cost ways of making nonionic detergents directly from the alpha olefins. There are several theoretical methods for doing this, among which can be included oxidation with ozone in order to form the carboxy acid with one less carbon than the olefin; sulfation, which gives only the secondary alcohol, high pressure synthesis with carbon monoxide and the oxo reaction to give a primary alcohol; or the abnormal reverse addition of hydrogen bromide to the alpha olefin to form a primary bromide which can be hydrolyzed to the primary alcohol. The two most commercially feasible methods appear to be the oxo reaction and the hydrogen bromide reverse addition. The first is marked by the high cost of the high pressure reaction that must be carried out with carbon monoxide and the second by the difficulty of recovering the bromine in the degraded form from the hydrolysis which produces primary alcohol.

In general, the coconut derived diethanol amides, which have been used as performance standards for foam building and foam persistence, are superior to primary alcohol derived detergents in many ways.

It is, therefore, an object of the present invention to provide a method for producing novel higher alcohols directly from olefins.

It is a further object of the present invention to provide novel nonionic detergent compositions.

It is a further object of the present invention to provide novel chemical compositions.

It is also an object of the present invention to provide novel cyclic alcohols and novel linear glycols which can be ethoxylated to form improved nonionic detergents and detergent compositions.

These and other objects will be made readily apparent from the following specification and examples.

SUMMARY

This invention relates to the conversion of olefins in the presence of an aldehyde and a strong acid to form an unexpected cyclic higher alcohol containing product which can be ethoxylated to produce nonionic detergents. The invention also relates to the formation of novel alkyltetrahydropyranols and 1,3-glycols. More specifically, the invention relates to the condensation of a high molecular weight olefin with an aldehyde in the presence of a concentrated aqueous solution of mineral acid to form a product which can be ethoxylated.

These ethoxylated higher alcohols have exceptional detergent properties. They are the equivalent of the coconut oil derived diethanol amide with regard to foam and foam persistence. Furthermore, the nonionics of this invention are superior to diethanol amides in mildness and emollient effect on the skin. Superiority over coconut oil amides also exists in the less expensive manufacturing procedures for our detergents.

DRAWING

The figure is an infrared spectrum of a higher alcohol obtained by the reaction of 1-dodecene with formaldehyde in a strong acid.

DETAILED DESCRIPTION

According to the present invention, it has been found that an alcohol results from the reaction product of higher olefins with aldehydes in the presence of concentrated acid. Further, the reaction product can be ethoxylated to form a nonionic detergent having desirable properties.

The reaction of an olefin and an aldehyde is generally known as the Prins reaction. A summary of the state of the art regarding the Prins reaction is given in an article by Arundale and Mikeska, Chemical Reviews, 51, 506 (1952). As indicated by Arundale, the Prins reaction has generally been applied to low molecular weight olefins to form meta-dioxanes and 1,3-diols. A Russian article by Kuliev and Zul'fugarova abstracted in Chemical Abstracts, 61, 10676 (1964) indicates that meta-dioxanes are obtained from $C_6$ to $C_{10}$ alpha olefins in 50% sulfuric acid.

In the reaction of the present invention, alpha olefins containing from 8 to 24 carbon atoms may be used. In general, the olefins should contain from 10 to 18 carbon atoms and preferably from 11 to 14 carbon atoms. The reaction of this invention is applicable to a single olefin or to a range of olefins having different carbon chain lengths. The preferred source is olefins obtained from cracked wax and especially those refined through molecular sieves. However, the present invention is also applicable to olefins obtained from other sources such as Ziegler build-up, polyethylene cracking, oxo process olefins, catalytic dehydrogenation of linear paraffins, etc.

The preferred aldehyde is formaldehyde used as a concentrated Formalin solution or as a formaldehyde solid polymer such as paraformaldehyde or trioxymethylene. However, any reactive aldehyde may be used in the invention, especially aliphatic aldehydes such as acetaldehyde, propionaldehyde or butyraldehyde may be used. The aldehydes used in this invention in general will contain from 1 to 7 carbon atoms and preferably 1 to 4 carbon atoms. The ratio of aldehyde to olefin may vary from about 0.5:1 to about 5:1. Preferably, the ratio should be in the range of about 1:1 to 3:1.

The reaction of this invention is carried out in a strongly acid solution. Suitable acids include phosphoric acid and sulfuric acid, sulfuric acid with acetic acid, and phosphoric acid with boron trifluoride. Aqueous solutions of sulfuric acid in concentrations of about 70% to 80% are preferred. We have found that a rapid, smooth reaction resulting in high olefin conversion without significant production of undesirable by-products requires the high sulfuric acid concentration.

In general, elevated temperatures are desired and we prefer to operate in a temperature range of about 40° C. to 60° C. The best yield has been obtained at a temperature of about 50° C. However, the reaction can be carried on outside this range although longer reaction times or lower yields may be experienced depending upon the particular reactant used.

The reaction may be carried out by batch or continuous methods. Reaction rates are relatively rapid so that batch reaction equipment can be used. On the other hand, if desired, the reaction may be carried out in a continuous reactor. Unreacted olefin and aldehyde may be recycled to the reactor along with acid which has been separated from the product.

Prior to reacting the olefin and aldehyde, it may be desired to purify the olefin. Such purification may indeed proce necessary in order to obtain an olefin reaction product which will readily ethoxylate. Purification of the starting olefin will remove diolefins, peroxides, and other contaminants. Purification may be accomplished by treating with concentrated sulfuric acid, e.g., 90% sulfuric acid at a reduced temperature. A particularly suitable treatment is a 90% sulfuric acid treatment at 40° F. for 15 minutes.

At the termination of the reaction between the aldehyde and olefin it may be desirable to separate the reaction products by adding water. In any event, the reaction product is usually in the form of an emulsion. Furthermore, a reaction product will contain various impurities. In order to obtain a product which will readily ethoxylate and which can be easily handled, it is preferred that the reaction product be purified.

After the reaction is complete, the emulsified reaction product can be purified and the emulsion broken by heating or refluxing the reaction product with an aqueous solution of a mineral acid. Any mineral acid, preferably of low volatility, such as sulfuric acid or phosphoric acid, may be used. The acid concentration may vary from about 1% to about 40% although we prefer to use an acid concentration of about 2% to 20%. In general, elevated temperatures near the boiling point of the acidified emulsion should be used.

Surprisingly, it has been found that this acid treatment may be necessary in order to form a product which will ethoxylate. Thus, we have found that reaction products which are not given our acid treatment may fail to ethoxylate or may ethoxylate incompletely. It has been found that the product from cracked wax olefins appear to ethoxylate more readily than from other olefins such as synthetic ethylene derived olefins.

An increase in hydroxyl number of the product has been observed during the acid treatment, indicating an increase in hydroxyl groups. Although the acid treatment may hydrolyze some meta-dioxane to a 1,3-glycol, it is probable that acid treatment raises the hydroxyl number by converting possible lactones, linear formals or other products of the reaction to alcohols.

Further purification and separation of the reaction products may also be carried out if desired. Thus, the acid treated product may be given a water wash with a basic solution, e.g., sodium hydroxide, to improve the color. Drying and decoloring of the product may be effected by various means, e.g., settling, clay treatment, warm sparging with nitrogen, vacuum distillation, steam distillation, azeotropic distillation, etc. Separation of the products may be obtained by crystallization or solvent recrystallization.

Analysis of the products obtained indicates that a minor portion of the reaction product is a meta-dioxane which may have the following formula:

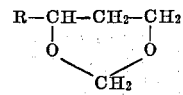

where R is an alkyl radical containing from 6 to 22 carbon atoms and 2 carbon atoms less than the starting olefin. This product usually comprises about 5% to 20% of the total product.

Another product obtained from the reaction is a higher alcohol. Thus, when a $C_{12}$ olefin is used, the hydroxyl number of the alcohol is about 237. The elemental analysis of the product indicates that more than one aldehyde has added to the olefin with a cyclic configuration as the most probable result. Analysis indicates that an alkyltetrahydropyranol is the main product of the reaction. The pyranol which can exist in both the cis and trans isomer has the following structure:

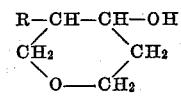

where R is an alkyl radical containing from 5 to 21 carbon atoms and 3 carbon atoms less than the starting olefin.

The nonyl-tetrahydro pyranol has a melting point in the range of 25° to 30° C., a refractive index ($n_D^{20}$) of about 1.464, a density of 0.931, a boiling point of about 132° to 133° C. (0.8 mm.) and a hydroxyl number of about 237. The infrared spectrum of the pyranol derived from 1-dodecene is shown in the figure. Characteristic peaks include OH stretch at 2.95 microns, secondary alcohol at 8.35 and 9.25 microns and ring C—O at 8.75 and 9.5 microns.

Although the reaction is not completely understood and we do not wish to be bound by the following as the only possible explanation, it may be that the reaction mechanism is as follows:

$$CH_2O + H_2SO_4 \longrightarrow \overset{+}{C}H_2OH + HSO_4^-$$

$$R-CH_2-CH=CH_2 + \overset{+}{C}H_2OH \longrightarrow RCH_2\overset{+}{C}H-CH_2-CH_2-OH$$

$$RCH_2\overset{+}{C}H-CH_2-CH_2-OH \xrightarrow{-H^+} RCH=CH-CH_2-CH_2-OH$$

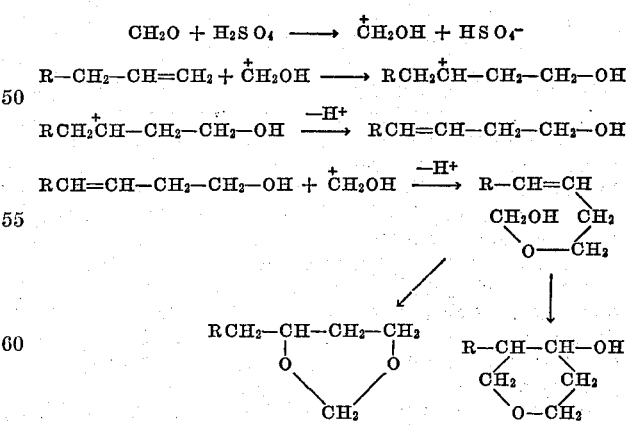

The amount of alkyl meta-dioxane formed apparently will vary somewhat depending upon the ratio of aldehyde to olefin. It has been found that with a low ratio, i.e., about 1:1, that dioxane formation appears to be minimized.

In addition to the dioxane and the pyranol, there may be many other by-products in the reaction mixture such as unreacted olefin, lactones, linear formals, etc.

A major constituents may be separated by various techniques. A method of distillation comprises first sulfating the product to convert the alcohol to a sulfate. Then, the vapor pressure of the products will be different enough that the unsulfated meta-dioxane material can be distilled from the mixture leaving the sulfated alcohols. Alternatively, the sulfated constituents may be cleanly separated from the unsulfated products by a solvent separation scheme using aqueous alcohol (50:50) and petroleum ether.

Another convenient method of separating the products is to use a solvent separation scheme. By adding petroleum ether to the reaction mixture and chilling to about 0° C., the hydroxylated compound can be crystallized out from the solution. On the other hand, if it is desired to obtain the solid dioxane, a methanol solution which is chilled to about 0° C. will crystallize out the dioxane.

The dioxane can be converted to a 1,3-diol by alcoholysis in acid. Thus, for example, a meta-dioxane containing 14 carbon atoms is converted to a 1,3-tridecanediol by heating in methanol containing sulfuric acid.

Ethoxylation may be carried out by any of the well-known methods of ethoxylating. For example, the product may be reacted with sodium methylate, sodium hydroxide or sodium metal in an inert atmosphere and then exposed to ethylene oxide, e.g., by bubbling ethylene oxide through the liquid at elevated temperatures. Alternatively, acid catalysts such as sulfuric or phosphoric may be used. The degree of ethoxylation can be controlled by the amount of ethylene oxide which is added. Thus, a 1 mol, 2 to 4 mol, 5 to 8 mol, or up even to 20 mol ethoxylate may be formed. The preferred range is from about 5 to 8 mols. However, when sulfation of the ethoxylate is contemplated, a range of 1 to 4 mols is preferred. Typical ethoxylation temperatures range from about 125° C. to 225° C. or more.

The invention can be more fully understood by reference to the examples which follow.

The ethoxylated products of the present invention are especially useful as nonionic detergents. Thus, in a light-duty liquid detergent, the ethoxylated product of the present invention is equal to or better than standard ethoxylates from primary alcohols and alkylphenols. Furthermore, the ethoxylated product of the present invention showed outstanding mildness to the skin.

The products of this invention may also be sulfated. Thus, either the higher alcohol or ethoxylate may be sulfated to form useful detergent materials, e.g., by using chlorosulfonic acid.

In addition to detergent use, the products of the present invention can be used as solvents, emulsifiers, skin softeners, or may be converted to esters, etc., and used as lubricants.

The invention is further illustrated by reference to the following examples.

EXAMPLE I

A commercial cracked wax alpha olefin mixture (Chevron Alpha Olefins ($C_{11}$-$C_{14}$) was pretreated using 2% by weight of 90% sulfuric acid at 40° F. for 2 minutes. The olefin (1.5 mols) was reacted with 1.6 mols of paraformaldehyde in 235 grams of 75% sulfuric acid. The olefin was added gradually to the stirred slurry of paraformaldehyde and acid held at about 40° C. to 47° C. A mild exotherm occurred within 20 minutes (67° C.), following which the reaction temperature was maintained between 47° C. to 64° C. with occasional external cooling and moderate heating near the end of the four hour reaction period.

The clear dark reaction mixture was contacted with several volumes of hot water. The resulting emulsion broke readily after 15 to 30 minutes of boiling and an aqueous phase containing by-products (deleterious to the utilization of this product) were withdrawn. This step was repeated with 500 cc. of 3% sulfuric acid. The reaction product was then contacted with hot (90° C. to 100° C.) 25% caustic soda solution. Separation overnight yielded 303 grams (90% theoretical) of straw-colored oil. Analysis showed: water, 1.40%; hydroxyl number, 150; refractive index ($n_D^{20}$), 1.4530; infrared spectrum included prominent peaks at 2.95 microns (OH stretch), 9.25 microns (secondary hydroxyl) and less pronounced peaks at 9.65 microns (metadioxane) and 11.1 microns (alpha olefins).

A 57 gram portion of the above reaction product was rigorously dried in an ethoxylation vessel with a warm dry nitrogen sparge and then reacted in a nitrogen atmosphere with 0.2 gram of sodium metal (catalyst). A slow stream of ethylene oxide was then introduced below the surface of the stirred liquid at 165° C. An exotherm ensued promptly with the temperature held between 175°–180° without external heating or cooling. Gas absorption was stopped after 90 minutes with a weight increase of 54 grams. The product was an offwhite slurry which dissolved completely in water with production of foam. Analysis showed: surface tension of 0.1% solution, 34.2 dynes/cm. at 24° C.; hydroxyl No. 80; infrared spectrum showed the adsorption peaks typical of an ethoxylate including maxima at 2.95 microns and 9 microns. The spectra was similar to other conventional ethoxylates.

The ethoxylate was evaluated for detergent properties in a dishwashing formulation. Detergent properties were evaluated according to the following procedure. Into a three quart mixing bowl in a constant temperature bath at 45° C., was placed 250 mls. of water containing 150 p.p.m. calcium carbonate. Five mls. of a sample solution prepared mixing 15 grams of sample in 150 mls. of water were then added to the bowl. The resulting solution was then stirred rapidly with a Beach-Russ electric mixer for one minute. The foam height in millimeters was then measured. The number of dishes which the solution could wash was determined by mixing equal volumes of Mazola oil and Wesson oil, adding six drops of the mixture to the test solution and stirring rapidly with a mixer for one minute. This procedure was repeated until the foam broke or until oil appeared on the surface of the water. One dish was equal to six drops of the oil mixture and the total number of dishes washed was equivalent to the number of six drops increments.

The composition of the formulations used in this test and the results are set forth below in Table 1.

TABLE 1.—COMPOSITION

| Ingredient: | Percent solids | | |
| --- | --- | --- | --- |
| Sodium dodecyl benzene sulfonate | 20 | 20 | 20 |
| Sodium xylene sulfonate | 6 | 6 | 6 |
| Coconut diethanol amide | | 3 | |
| Ethoxylate | | | 3 |
| Test results (0.06% concentration): | | | |
| Inital foam height (mm.) | 50 | 70 | 40 |
| Total dishes | 3 | 8 | 8 |
| Test results (0.12% concentration): | | | |
| Initial foam height (mm.) | 80 | 85 | 80 |
| Total dishes | 10 | 22+ | 22+ |

EXAMPLE II

To a stirred slurry of 45.5 g. of paraformaldehyde in 235 g. (1.5 mols) of 75% sulfuric acid was added 252 g. (1.5 mols) of linear 1-dodecene (B.P. 95° C. to 97° C./15 mm.) over 75 minutes at 48° C. to 50° C. After the first 15 minutes an exotherm occurred which momentarily raised the reaction temperature about 20° C. Slight cooling was applied throughout the period of olefin addition. The reaction mixture was then stirred at 50° C. to 62° C. for an additional 90 minutes. The addition of 500 cc. of cold water produced a tight emulsion which failed to break on overnight standing but responded promptly when brought to boiling. The crude product separated easily and was washed several times with hot water. It was then boiled briefly with 25% caustic soda solution followed by several hot water washes. After several hours standing the product containing higher alcohol was obtained as 280 g. of clear yellow oil. Analysis showed 1.54% water (Karl Fischer), $n_D^{25}$ 1.4480, hydroxyl number of 137.

The crude product was further purified by vacuum distillation from a batch still equipped with a short jacketed takeoff (no column). Analysis of the three overhead fractions (B.P. 65° C. to 150° C. at 1–2 mm. Hg) and a residue indicated that the crude product consisted of about 45% higher alcohol, 43% of 1-dodecene, 10% of 4-decyl-1,3-dioxane and 1% water. The fraction rich in higher alcohol (ca. 95% pure) was a colorless oil with $n_D^{22}$ 1.4620 and hydroxyl number of 230. The infrared spectrum showed strong OH stretch at wavelength 2.9 microns, absorption peaks attributable to primary and secondary alcohols and a long hydrocarbon chain. The residue fraction of 25 g. was estimated to consist of about half alcohol (based on hydroxyl number of 122) and half meta-dioxane (judging from infrared absorption at 9.25 microns).

EXAMPLES III–VIII

The procedure of Example I for reacting olefins with aldehydes was repeated using a linear 1-dodecene and varying reaction conditions. The reaction conditions and product analysis are set forth in Table 2.

TABLE 2.—REACTIONS OF LINEAR 1-DODECENE WITH FORMALDEHYDE IN AQUEOUS SULFURIC ACID

| Example | HCHO/ olefin, molar ratio | Sulfuric acid conc., wt. percent | Conditions | | Product yield and properties | | | |
|---|---|---|---|---|---|---|---|---|
| | | | Temp., °C. | Time, hrs. | Parts/100 Parts olefin | Hydroxyl number | Refractive index, °C.[1] | Color Gardne. |
| III | 1/1 | 75 | 48–69 | 8 | 115 | 151 | 1.4504(25) | 13 |
| IV | 2/1 | 75 | 48–58 | 2 | 137 | 141 | 1.4600(22) | 7 |
| V | 2/1 | 75 | 50–58 | 2.5 | 128 | 110 | 1.4636(23) | 6 |
| VI | [2] 1.25/1 | 25 | 100–110 | 7 | 100 | 0 | 1.4315(22) | |
| VII | [2] 1.33/1 | 50 | 110–118 | 11 | 100 | 16 | 1.4390(25) | 7 |
| VIII | [3] 1.25/1 | 75 | 46–62 | 6 | 127 | 137 | 1.4550(25) | 15 |

[1] Refractive index of 1-dodecene is 1.4304 (20° C.).
[2] Aqueous formaldehyde used in these runs rather than paraformaldehyde.
[3] The component added last in this case was paraformaldehyde rather than olefin.

NOTE.—Example V did not include treatment of the product by boiling with dilute sulfuric acid.

EXAMPLES IX–XVI

The procedure of Example I for reacting olefins with aldehydes was repeated using olefins of varying chain lengths. All of the olefins were derived from wax cracking except in Example XII where the Gulf Alpha Olefin used was obtained by ethylene polymerization. The reaction conditions and product characteristics are set forth in Table 3.

TABLE 3.—REACTION WITH HIGHER ALPHA OLEFINS

| Example | Olefin carbon range | HCHO/ olefin | Sulfuric acid conc., percent | Conditions | | Parts/100 parts olefin | Hydroxyl number | Refractive. index, °C. |
|---|---|---|---|---|---|---|---|---|
| | | | | Temp., °C. | Time, hrs. | | | |
| IX | 9–10 | 1.1/1 | 72.5 | 50–52 | 3.5 | 107 | 190 | 1.4508 (22) |
| X | 11–14 | 1.1/1 | 75 | 48–63 | 4 | 111 | 150 | 1.4530 (25) |
| XI | 11–14 | 2/1 | 70 | 43–63 | 4 | 108 | N.r. | 1.4591 (21) |
| XII | 14–16 | 1.75/1 | 80 | 45–52 | 2 | 122 | 146 | 1.4596 (23) |
| XIII | 15–18 | 1.2/1 | 77.5 | 49–62 | 2.2 | 115 | 125 | 1.4580 (25) |
| XIV | 15–18 | 1.5/1 | 77.5 | 50–67 | 2.2 | 118 | 129 | 1.4607 (25) |
| XV | 15–18 | 2/1 | 80 | 45–60 | 2 | 125 | N.r. | 1.4663 (23) |
| XVI | 9–18 | 1/1 | 75 | 49–61 | 3.5 | 114 | 138 | 1.4520 (24) |

EXAMPLES XVII–XXV

Ethoxylation of alkyl pyranol containing reaction products was carried out in accordance with the procedure of Example I. In examples XVII–XIX the alkyl pyranol was obtained from a $C_{12}$ olefin and purified by distillation. In Examples XX–XXV the product of the olefin and aldehyde reaction was given an acid treatment before ethoxylation.

The initial foam and dishwashing results were determined according to the procedure of Example I.

The ethoxylate was compounded with a detergent formula having the following composition.

LIGHT-DUTY LIQUID DETERGENT FOR PERFORMANCE EVALUATION

Ingredient: Percent solids
- Calsoft ammonium sulfonate _____ 22
- Calamide C (coconut oil diethanolamide) _____ 2
- Sodium xylene sulfonate _____ 10
- Nonionic _____ 7.5
- $H_2SO_4$ 1:4, q.s. pH 7.0.

A dishwashing evaluation on the above composition showed that it washed from 12 to 17 dishes as compared to 13 for a primary alcohol ethoxylate and 15 for an alkylphenol ethoxylate.

The results are set forth in Table 4.

TABLE 4.—ETHOXYLATES OF PRODUCT FROM HIGHER OLEFINS

| | Alcohol carbon range | Mols E.O./ mol alcohol, approx. | Melting range, (°C.) | 1% cloud point | Surface tension, dynes/cm.[1] | Initial foam, (mm.) | Dishes washed, (number)[2] | Hydroxyl number of alcohol | Alcoho, purity percent |
|---|---|---|---|---|---|---|---|---|---|
| Example: | | | | | | | | | |
| XVII | $C_{14}$ | 4.4 | 12–16 | [3] | 31 | 50 | 17 | 226 | 93.5 |
| XVIII | | 7.2 | 30–35 | 68 | 32 | 50 | 15 | 226 | |
| XIX | | 10.3 | 35–40 | 84 | | 50 | 15 | 226 | |
| XX | $C_{13}$–$C_{16}$ | 6.5 | 22–25 | [3] | | N.r. | N.r. | 150 | |
| XXI | | 8.3 | 24–26 | 88 | | N.r. | N.r. | 150 | |
| XXII | | 10.0 | 34–38 | 100 | 38 | 35 | 15 | | 90 |
| XXIII | | 13.6 | 34–38 | 100 | 38 | 40 | 13 | | 60–65 |
| XXIV | $C_{17}$–$C_{20}$ | 9.3 | 30–33 | 92 | 39 | 40 | 12 | 125 | |
| XXV | | 22.0 | 34–38 | 100 | 39 | 45 | 14 | | |

[1] Surface tensions measured on 0.1% solutions at 24° C.
[2] Formulated in a light-duty liquid detergent (see Table 4). Comparative detergency is shown here with 7.5% ethoxylate in the formulation (used at 0.06%). For comparison the number of dishes washed in this test by other ethoxylate types was: primary alcohol ethoxylate, 13; alkylphenol ethoxylate, 15.
[3] Hazy at room temperature.

EXAMPLE XXVI

A nonyl tetrahydropyranol was evaluated for detergency according to the method of Example I. A composition containing 20% sodium dodecyl benzene sulfonate, 6% sodium xylene sulfonate and 3% nonyl tetrahydropyranol in a concentration of 0.12% gave an initial foam height of 80 mm. and washed a total of 14 dishes. The control which did not contain the nonyl tetrahydropyranol gave an initial foam height of 80 mm. and washed a total of 10 dishes.

EXAMPLE XXVII

A solution of 30 grams of 4-decyl-m-dioxane (M.P. 43° C.) in 175 ml. of anhydrous methanol containing 1.0 gram of concentrated sulfuric acid was refluxed for about 16 hours. The volatile (B.P. 42° C.) by-product dimethylformal was gradually removed from the system by slow distillation with occasional methanol replenishments. The reaction solution was then neutralized with soda ash, filtered and solvent evaporated. Recrystallization of the residue from pet ether yielded 26 g. of white crystalline glycol: M.P. 53°–54° C.; hydroxy No. 422; and infrared spectra which was typical of a higher glycol containing primary and secondary hydroxyl groups.

The glycol (20.5 g.) was reacted with 0.1 gram of sodium metal in a nitrogen atmosphere. Ethylene oxide absorption occurred smoothly beginning at 175° C. and was stopped after about ten grams had been taken up. The product was a pale yellow oil of hydroxyl number 189. A 0.1% solution in water showed a surface tension of 31.6 dynes/cm. The infrared spectra generally resembled that of a primary alcohol ethoxylate with the major peak at 9.0 microns.

Chlorosulfonic acid (4.2 g.) dissolved in two volumes of diethyl ether was added dropwise with stirring to 10 grams of the 1,3-tridecanediol-3-mol ethoxylate over 30 minutes at 10° C. By-product HCl was removed with a nitrogen sparge as the temperature was raised to 40° C. The product acid was converted to the ammonium salt (14 grams) following ammonia addition and solvent evaporation.

The 3 mol ethoxylate and the ammonium salt of the sulfated 3 mol ethoxylate of 1,3-tridecane-diol, prepared above, were evaluated in a sodium sulfonate based detergent at 0.12% and 150 p.p.m. water hardness. The results are given in Table 5.

TABLE 5

| | Percent solids | | |
|---|---|---|---|
| | Sulfate | Ethoxylate | Control |
| Ingredient: | | | |
| Sodium dodecyl benzene sulfonate | 20 | 20 | 20 |
| Sodium xylene sulfonate | 6 | 6 | 6 |
| Sulfated 1,3-glycol ethoxylate | 3 | | |
| 1,3-glycol ethoxylate | | 3 | |
| Total | 29 | 29 | 26 |
| Test results:[1] | | | |
| Initial foam weight, mm | 85 | 80 | 90 |
| Total dishes | 18 | 18 | 12 |

[1] Concentration: 0.12%; water hardness: 150 p.p.m.

The sulfated 1,3-glycol ethoxylate showed greater solubility than the 1,3-glycol ethoxylate (3 mols). Although it was not soluble at room temperature a clear solution was obtained after heating the detergency system to approximately 120° F. On cooling the detergent system remained clear and homogeneous at room temperature.

It should be understood that the foregoing description and examples are not to be construed as limiting the scope of the invention but are merely illustrative of various embodiments of the present invention. Thus, it can be seen that a wide variety of starting olefins and aldehydes may be used in this invention to form our novel product. Furthermore, within the framework of this disclosure a wide variety of reaction conditions may be used. The product may be used without separation. Furthermore, the dioxane may be converted to a 1,3-glycol prior to ethoxylation. Of course, the product of the reaction may be used for many purposes other than as an ethoxylated surfactant. Thus, it can be seen that this invention is to be limited only to the lawful scope of the accompanying claims.

What is claimed is:

1. A composition of matter having the formula:

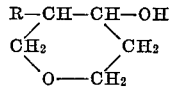

wherein R is an alkyl having from 5 to 21 carbon atoms.

2. The composition of matter of claim 1 wherein R is an alkyl group containing 12 carbon atoms.

3. A composition of matter of claim 1 wherein R is an alkyl containing from 8 to 11 carbon atoms.

4. The composition of matter of claim 1 wherein R is a linear alkyl.

5. The composition of matter of claim 1 wherein R is a linear alkyl containing more than 8 carbon atoms.

6. A composition of matter having the formula:

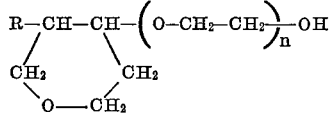

wherein R is an alkyl containing from 5 to 21 carbon atoms and $n$ is an integer from 1 to 20.

References Cited

UNITED STATES PATENTS 3,159,653   12/1964   Falbe et al. _____ 260—345.9

OTHER REFERENCES

Hanschke: "Chemische Berichte," Jahrg. 88, Nr. 7 (1955), pp. 1053–61.

ALEX MAZEL, Primary Examiner

J. H. TURNIPSEED, Assistant Examiner

U.S. Cl. X.R.

252—52, 152, 161; 260—340.7, 343.5, 456, 615, 617, 635, 999